(12) United States Patent  
Brunel et al.

(10) Patent No.: US 8,996,048 B2  
(45) Date of Patent: Mar. 31, 2015

(54) CONTROLLING THE INTERFERENCES GENERATED BY RADIO SIGNALS

(75) Inventors: Loic Brunel, Rennes Cedex 7 (FR); Nicolas Gresset, Rennes Cedex 7 (FR)

(73) Assignee: Mitsubishi Electric Corporation, Tokyo (JP)

(*) Notice: Subject to any disclaimer, the term of this patent is extended or adjusted under 35 U.S.C. 154(b) by 347 days.

(21) Appl. No.: 13/509,715

(22) PCT Filed: Nov. 10, 2010

(86) PCT No.: PCT/EP2010/067171  
§ 371 (c)(1), (2), (4) Date: Jun. 26, 2012

(87) PCT Pub. No.: WO2011/061101  
PCT Pub. Date: May 26, 2011

(65) Prior Publication Data  
US 2012/0270581 A1 Oct. 25, 2012

(30) Foreign Application Priority Data  
Nov. 18, 2009 (EP) .................... 09176341

(51) Int. Cl.  
*H04B 7/00* (2006.01)  
*H04B 15/00* (2006.01)  
(Continued)

(52) U.S. Cl.  
CPC ............ *H04W 16/10* (2013.01); *H04W 72/082* (2013.01); *H04W 84/045* (2013.01); *H04W 92/12* (2013.01)  
USPC .......................... 455/501; 455/63.1; 455/570

(58) Field of Classification Search  
USPC ............... 455/63.1, 63.2, 446, 450, 500, 501, 455/516, 517, 524, 525, 550.1, 552.1, 561, 455/562.1, 569.1, 570  
See application file for complete search history.

(56) References Cited

U.S. PATENT DOCUMENTS 5,862,487 A * 1/1999 Fujii et al. ................. 455/454  
7,403,793 B2 * 7/2008 Mauney et al. ............ 455/552.1  
(Continued)

FOREIGN PATENT DOCUMENTS

WO 2009 129413 10/2009

OTHER PUBLICATIONS

TSG-RAN Working Group 4 (Radio) meeting #52 R4-093203, "Downlink Interference Coordination Between eNodeB and Home eNodeB," NTT DOCOMO, Total 5 Pages, (Aug. 24-28, 2009).

(Continued)

*Primary Examiner* — Nhan Le  
(74) *Attorney, Agent, or Firm* — Oblon, McClelland Maier & Neustadt, L.L.P.

(57) ABSTRACT

The present invention concerns a method for controlling the interferences generated by radio signals transferred by or to wireless telecommunication devices of a wireless cellular telecommunication network. The method comprises the steps of:
  forming at least one group of wireless telecommunication devices,
  allocating at least one identifier to each wireless telecommunication device of the group, the at least one identifier, said as group identifier, being allocated to each wireless telecommunication device of the group of wireless telecommunication devices, the group identifier being intended to be transferred by each wireless telecommunication device to mobile terminals in parallel with another identifier,
  allocating the same parameters for controlling the interferences generated by radio signals transferred to or by each wireless telecommunication device of the group.

6 Claims, 5 Drawing Sheets

(51) Int. Cl.
*H04W 16/10* (2009.01)
*H04W 72/08* (2009.01)
*H04W 84/04* (2009.01)
*H04W 92/12* (2009.01)

(56) References Cited

U.S. PATENT DOCUMENTS 7,903,575 B2 * 3/2011 Yoon et al. .................... 370/252
8,036,099 B2 * 10/2011 Zangi et al. ................... 370/208

2009/0264077 A1 10/2009 Damnjanovic

OTHER PUBLICATIONS

3GPP TSG-RAN WG1 Meeting #59 R1-094839, "HeNB Interference Coordination," Motorola, Total 4 Pages, (Nov. 8-14, 2009).
3GPP TSG-RAN WG1 #59 R1-094682, "Consideration on scenarios for Heterogenous Networks including cluster of femto-cells with same CSG ID," Pantech&Curitel, Total 3 Pages, (Nov. 9-13, 2009).
International Search Report Issued Apr. 26, 2011 in PCT/EP10/67171 Filed Nov. 10, 2010.

* cited by examiner

CONTROLLING THE INTERFERENCES GENERATED BY RADIO SIGNALS

The present invention relates generally to a method and a device for controlling the interferences generated by radio signals transferred by or to wireless telecommunication devices of a wireless cellular telecommunication network.

In order to avoid interferences generated by base stations and mobile terminals, inter-cell interference coordination (ICIC) techniques have been developed.

Classically, a mobile terminal reports to the base station the mobile terminal is currently served by, the interference it receives from neighbouring base stations. The base station also estimates the interference it experiences from mobile terminals served by neighbouring base stations. Base stations also exchange messages between each other in order to perform an efficient ICIC.

Without shadowing, the interference level depends on the distance separating the base stations. The higher the distance between base stations is, the lower the interference is. It also depends on their respective transmit powers.

With shadowing, the interference level is not only related to the distance between the base stations and their respective transmit powers. The interference also depends on the shadowing between each mobile terminal and the two base stations.

In classic wireless cellular telecommunication networks, each base station has an identifier like a physical cell identity (PCID) for each of its cells or each sector of its cell or cells. The PCID characterises a cell or sector of the base station in the physical layer.

For example, the PCID is associated to two sequences, a first sequence named PSC sequence or Primary Synchronisation Signal (PSS) is transferred in the Primary Synchronisation Channel (PSC) and a second sequence named SSC sequence or Secondary Synchronisation Signal (SSS) is transferred in the Secondary Synchronisation Channel (SSC).

For example, three PSC sequences are available in the wireless cellular telecommunication network, each having good time auto-correlation properties.

For example, in addition to PCID identification, the PSC sequences may be used for rough synchronisation and for channel estimation enabling coherent detection of the SSC sequence. In addition to PCID identification, the SSC sequences may be used for synchronisation refinement.

For example, the three PSC sequences are quasi-orthogonal in order to ensure efficient time synchronisation for three different synchronised cells.

For example, hundred sixty eight SSC sequences are available in the wireless cellular telecommunication network, each having low cross-correlation with other SSC sequences.

According to the aforementioned example, the total number of PCIDs is then equal to five hundred and four.

Today, wireless cellular telecommunication networks are largely deployed but there are still some areas not covered by the base stations of the wireless cellular telecommunication network.

The access to the wireless cellular telecommunication network might not be possible for a mobile terminal located in a building, if the signals radiated by the base stations are too attenuated.

Solutions are proposed today. Particular wireless telecommunication devices, like home base stations or femto base stations or pico base stations, provide coverage areas at least within the buildings. Relays are also considered.

Home base stations may enable a limited number of mobile terminals to access the wireless cellular telecommunication network through their respective resources.

Relays rely on signals transferred by base stations and/or signals they transfer to a base station to enable a limited number of mobile terminals to access the wireless cellular telecommunication network through their respective resources.

For example, relays are wireless telecommunication devices which transmit their own signal as if they were base stations or home base stations. Mobile terminals communicate with these relays as if they were base stations or home base stations. However, unlike a base station or a home base station which has a wired connection to a telecommunication network, the relay only has a wireless connection with a base station or a home base station and its connection to the telecommunication network is done via the base station or the home base station.

Due to the constant coverage area size reduction and spectral efficiency increase, the amount of home base stations and/or relays becomes very important and situation may occur wherein classic ICIC techniques cannot be used.

The present invention aims at providing a solution which enables inter-cell interference coordination technique to be used in a wireless cellular telecommunication network in which wireless telecommunication devices like home base stations and/or relays are deployed.

To that end, the present invention concerns a method for controlling the interferences generated by radio signals transferred by or to wireless telecommunication devices of a wireless cellular telecommunication network, characterised in that the method comprises the steps of:

forming at least one group of wireless telecommunication devices, allocating at least one identifier to each wireless telecommunication device of the group of wireless telecommunication devices, the at least one identifier, said as group identifier, being allocated to each wireless telecommunication device of the group of wireless telecommunication devices, the group identifier being intended to be transferred by each wireless telecommunication device of the group of wireless telecommunication devices to mobile terminals in parallel with another identifier which is not shared with each wireless telecommunication device of the group of wireless telecommunication devices, allocating the same parameters for controlling the interferences generated by radio signals transferred to or by each wireless telecommunication device of the group of wireless telecommunication devices.

The present invention concerns also a device for controlling the interferences generated by radio signals transferred by or to wireless telecommunication devices of a wireless cellular telecommunication network, characterised in that the device for controlling the interferences comprises:

means for forming at least one group of wireless telecommunication devices, means for allocating at least one identifier to each wireless telecommunication device of the group of wireless telecommunication devices, the at least one identifier, said as group identifier, being allocated to each wireless telecommunication device of the group of wireless telecommunication devices, the group identifier being intended to be transferred by each wireless telecommunication device of the group of wireless telecommunication devices to mobile terminals in parallel with another identifier which is not shared with each wireless telecommunication device of the group of wireless telecommunication devices, means for allocating the same parameters for controlling the interferences generated by radio signals transferred to or by each wireless telecommunication device of the group of wireless telecommunication devices.

Thus, inter-cell interference coordination technique can be used in a wireless cellular telecommunication network in which wireless telecommunication devices like home base stations and/or relays are deployed as each wireless telecommunication device of the group of wireless telecommunication devices shares the same identifier and the same parameters for controlling the interferences generated by radio signals.

The mobile terminals served by base stations or home base stations or a relay in the neighbourhood of a given base station can report measures for the whole group, as if it were a single base station or wireless telecommunication device. Thanks to the transmission of at least two identifiers, the mobile terminals make reports for at least two identifiers, at least one identifier corresponding to a true cell, in which data communications happen and to which the mobile terminals are likely to be handed over, and at least one other identifier, the group identifier, corresponding to a fake cell, in which data communications do not happen.

It is then easier for the neighbour base station or home base station to handle the group as if it were a single base station or wireless telecommunication device or cell or sector.

According to a particular feature, the group identifier and the parameters for controlling the interferences generated by radio signals form a couple of information, the couple of information being intended for an uplink channel or for a downlink channel of the wireless telecommunication device.

Thus, it is possible to control the interferences generated by radio signals in the downlink channel or in the uplink channel according to the group identifier. There is a direct relationship between the parameters for controlling the interferences generated by radio signals and the group identifier. Parameters for controlling the interferences generated by radio signals can be changed by allocating a new group identifier to a wireless telecommunication device. Parameters for controlling the interferences generated by radio signals of a whole group of wireless telecommunication devices can be modified by changing the couple of information, associating new parameters for controlling the interferences generated by radio signals to the group identifier of the group of wireless telecommunication devices.

Since each couple, and thus each group identifier can be associated to an uplink channel or a downlink channel, different parameters for controlling the interferences generated by radio signals can be used in the uplink channel and the downlink channel, together with different groups of wireless telecommunication devices. Indeed, the interference behaves differently in uplink and downlink channels and distinct ICIC might be needed.

According to a particular feature, the method comprises further steps of:
receiving information representative of interferences received by at least one mobile terminal and/or at least one wireless telecommunication device and/or at least one base station,
determining from the information representative of interferences other parameters for controlling the interferences generated by radio signals,
determining, from the other parameters for controlling the interferences generated by radio signals, another group identifier to be allocated to each wireless telecommunication device of at least a part of the group of wireless telecommunication devices,
transferring to the at least part of the group of wireless telecommunication devices, the other group identifier and/or the other parameters for controlling the interferences generated by radio signals.

Thus, the parameters for controlling the interferences generated by radio signals can evolve in the time, for example together with installation or removal of base stations and/or home base stations and/or relays.

The parameters for controlling the interferences generated by radio signals of a given wireless telecommunication device can be changed by changing its group identifier. If the wireless telecommunication device already knows all possible couples of information formed by a group identifier and corresponding parameters for controlling the interferences generated by radio signals, the change can be done by signalling to the wireless telecommunication device a new group identifier and the wireless telecommunication device then deduces the new parameters for controlling the interferences generated by radio signals.

Alternatively, the change can be done by signalling to the wireless telecommunication device new parameters for controlling the interferences generated by radio signals and the wireless telecommunication device then deduces the new group identifier. If the wireless telecommunication device does not know all couples of information, a new couple of information can be signalled to it. The parameters for controlling the interferences generated by radio signals of a whole group can also be changed by changing a couple of information, i.e., by changing the parameters for controlling the interferences generated by radio signals associated to the group identifier of the group and broadcasting it in the group.

Alternatively, the new parameters for controlling the interferences generated by radio signals can be broadcasted in the group.

Alternatively, a new couple of information can be broadcasted in the group.

Alternatively, all new couples of information can be broadcasted, i.e. a list of all couples of information or part of them is stored and updated in each wireless telecommunication device.

According to a particular feature, the method is executed by a base station or a coordinator of the wireless cellular telecommunication network.

Thus, the base station is able to coordinate the interferences generated by radio signals transferred by or to wireless telecommunication devices under its coverage area.

A coordinator may be able to coordinate the interferences generated by radio signals transferred by or to wireless telecommunication devices under the coverage of several base stations and be able to better coordinate interferences generated by radio signals transferred by or to wireless telecommunication devices at the boundaries of coverage areas of base stations.

The present invention concerns also a method for controlling the interferences generated by radio signals transferred by or to wireless telecommunication devices of a wireless cellular telecommunication network, characterised in that the method comprises the steps executed by at least one wireless telecommunication device of:
obtaining a couple of information formed by a first identifier of the wireless telecommunication device intended to be transferred by the wireless telecommunication device base station to mobile terminals and by parameters for controlling the interferences generated by radio signals transferred by or to said wireless telecommunication device, obtaining a second identifier of the wireless telecommunication device, the second identifier being intended to be transferred by the wireless telecommunication device, transferring the first and second identifiers to mobile terminals, transferring radio signals according to the parameters for controlling the interferences generated by radio signals or transferring a message to at least one mobile terminal, the message comprising information related to the parameters for controlling the interferences generated by radio signals transferred by the at least one mobile terminal.

The present invention concerns also a device for controlling the interferences generated by radio signals transferred by or to wireless telecommunication devices of a wireless cellular telecommunication network, characterised in that the device for controlling the interferences is included in a wireless telecommunication device and comprises:

means for obtaining a couple of information formed by a first identifier of the wireless telecommunication device intended to be transferred by the wireless telecommunication device base station to mobile terminals and by parameters for controlling the interferences generated by radio signals transferred by or to said wireless telecommunication device, means for obtaining a second identifier of the wireless telecommunication device, the second identifier being intended to be transferred by the wireless telecommunication device, means for transferring the first and second identifiers to mobile terminals, means for transferring radio signals according to the parameters for controlling the interference generated by radio signals or transferring a message to at least one mobile terminal, the message comprising information related to the parameters for controlling the interference generated by radio signals transferred by the at least one mobile terminal.

Thus, the wireless telecommunication device is able to set appropriately its identifiers and the parameters for controlling the interferences generated by radio signals transferred by or received by the wireless telecommunication device according to a message received from a base station or a coordinator or according to its own sounding of its neighbourhood. This ability allows for adaptability of the ICIC and of the groups of wireless telecommunication devices.

Thanks to the transmission of at least two identifiers, the mobile terminals served by base stations or by home base stations or by relays in the neighbourhood of a base station or a home base station or a relay of the group can report measures for the whole group, as if it were a single base station or wireless telecommunication device.

The mobile terminals make reports for at least two identifiers, at least one identifier corresponding to a true cell, in which data communications happen and to which the mobile terminals are likely to be handed over, and at least one other identifier, the group identifier, corresponding to a fake cell, in which data communications do not happen.

It is then easier for the neighbour base station or home base station or relay to handle the group as if it were a single wireless telecommunication device or cell.

According to a particular feature, the couple of information is intended for an uplink channel or for a downlink channel of the wireless telecommunication device.

Since each couple, and thus each identifier can be associated to an uplink channel or a downlink channel, different parameters for controlling the interferences generated by signals can be used in uplink and downlink channels. Indeed, the interference behaves differently in uplink and downlink and distinct ICIC might be needed.

According to a particular feature, the first identifier of the wireless telecommunication device and/or the parameters for controlling the interferences generated by radio signals transferred or received by the wireless telecommunication device is obtained from a message transferred by a coordinator of the wireless cellular telecommunication network.

Thus, the ICIC is centralised at the coordinator, which is able to collect information from different base stations and/or wireless telecommunication devices. The coordinator can derive appropriate parameters for controlling the interferences generated by radio signals transferred or received by each wireless telecommunication device based on at least this information and inform the wireless telecommunication device.

According to a particular feature, the identifier of the wireless telecommunication device and/or the parameters for controlling the interferences generated by radio signals transferred or received by the wireless telecommunication device is obtained from a message transferred by a base station of the wireless cellular telecommunication network.

Thus, the base station is able to coordinate the interferences generated by radio signals transferred by or to wireless telecommunication devices under its coverage area.

According to a particular feature, at least two couples of information are allocated to the wireless telecommunication device by at least two different telecommunication devices and the wireless telecommunication device:

selects at least one of the received couples of information, transfers at least the identifier of the at least one selected couple of information to mobile terminals, transfers radio signals according to one received set of parameters or to a set of parameters derived from the at least two sets of parameters of the received couples of information or transfers a message to at least one mobile terminal comprising information related to one received set of parameters or to a set of parameters derived from the at least two sets of parameters of the received couples of information.

Thus, the wireless telecommunication device can belong to two different groups with different parameters for controlling the interferences generated by radio signals transferred or received by the wireless telecommunication device, each group of wireless telecommunication devices being determined by a telecommunication device like a base station or a coordinator.

By selecting, for example, the more restrictive parameters, the wireless telecommunication device ensures that the interferences will not be higher than expected.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example of embodiment, the said description being produced with reference to the accompanying drawings, among which:

Figure 5:
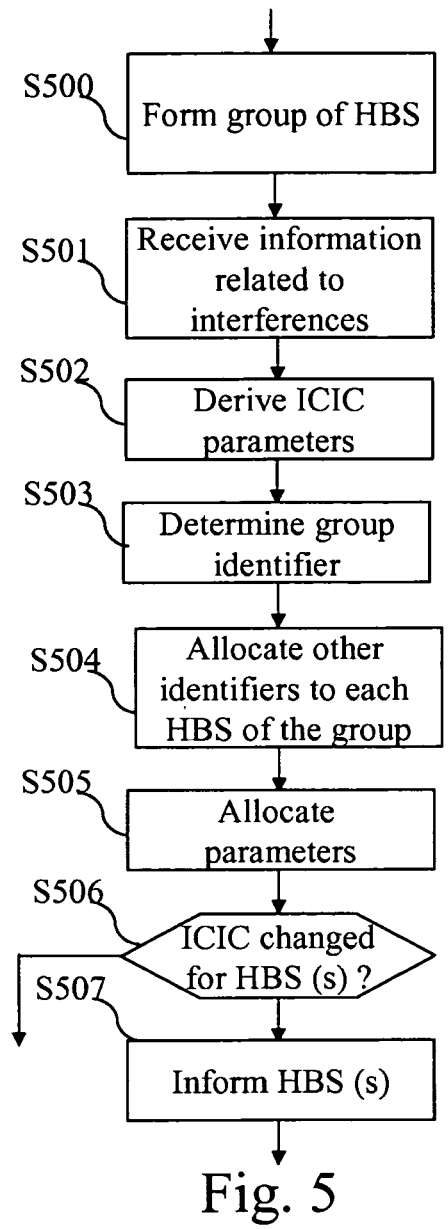
Figures 6, 7:
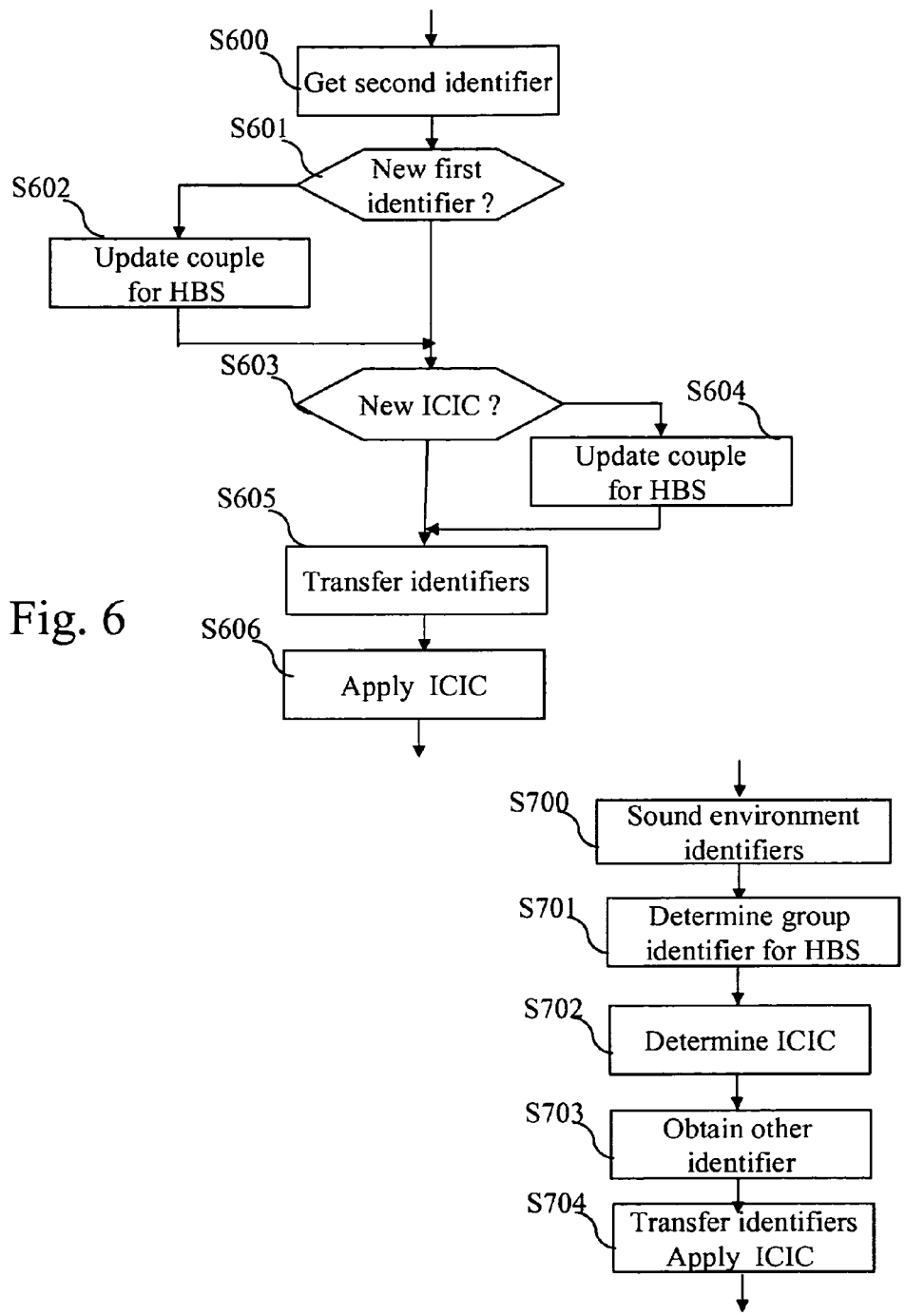
Figure 8:
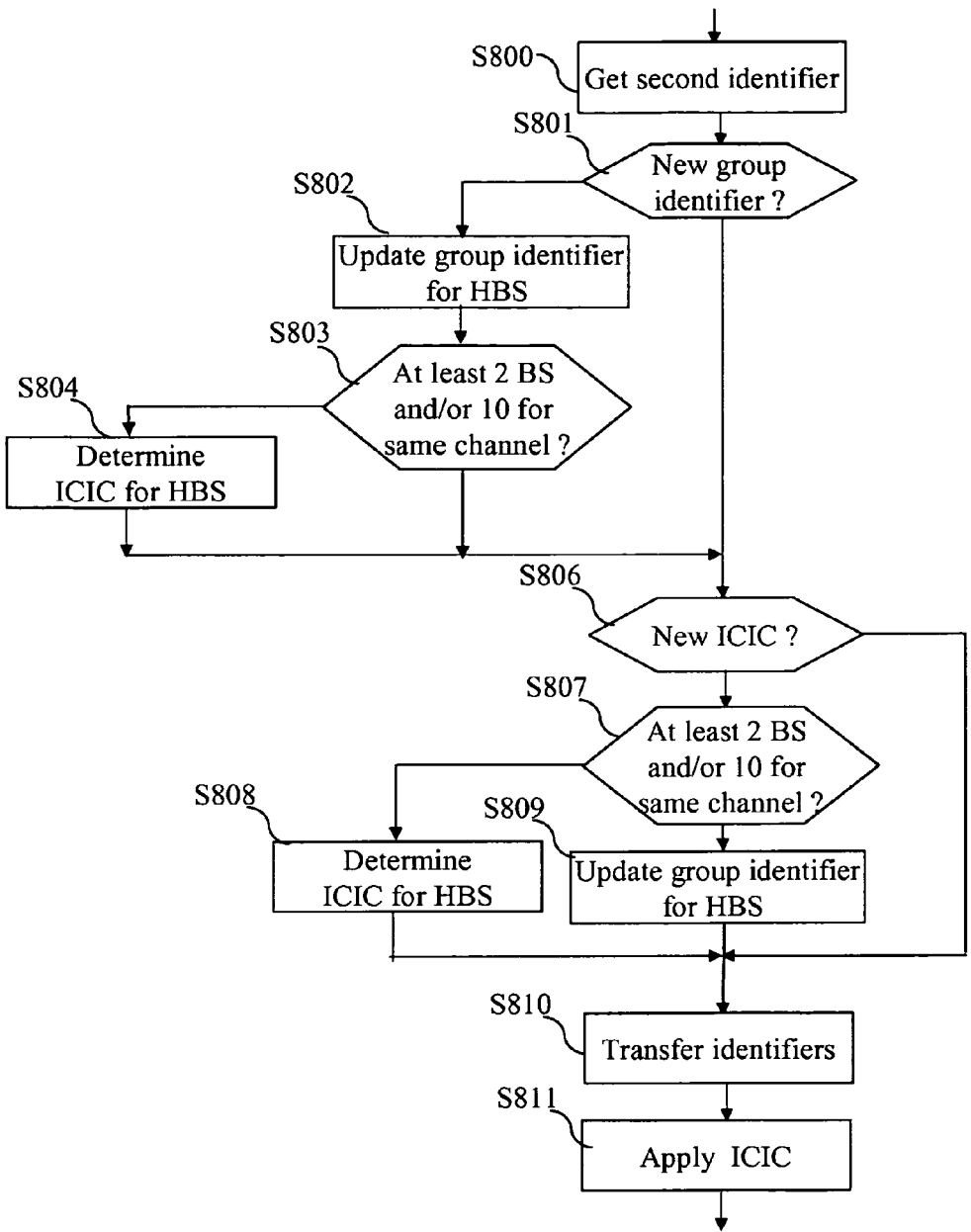

FIG. 5 discloses an example of an algorithm executed by the coordinator or the base station according to a first mode of realisation of the present invention;

FIG. 6 discloses an example of an algorithm executed by a wireless telecommunication device when the coordinator executes the algorithm of FIG. 5 according to the first mode of realisation of the present invention;

FIG. 7 discloses an example of an algorithm executed by a wireless telecommunication device according to a second mode of realisation of the present invention;

FIG. 8 discloses an example of an algorithm executed by a wireless telecommunication device when plural base stations and/or coordinators execute the algorithm of FIG. 5 according to the first mode of realisation of the present invention.

Figure 1:
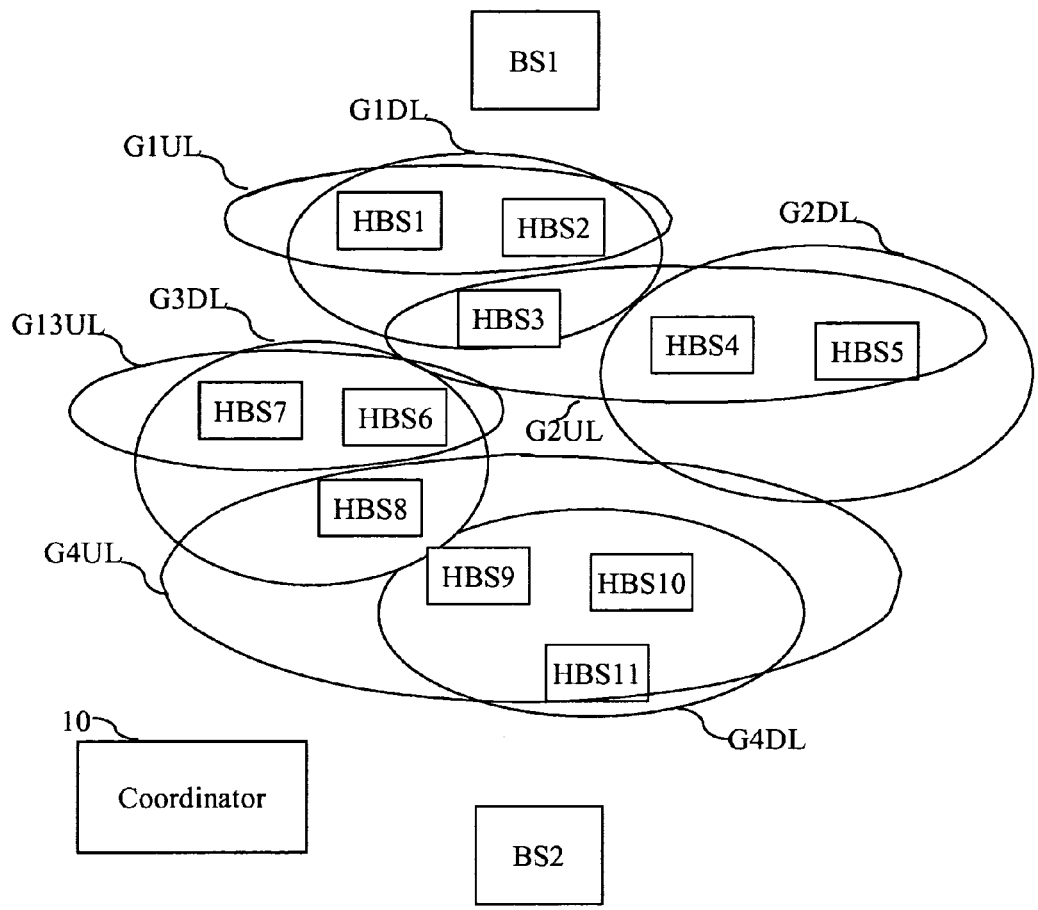
FIG. 1 represents a wireless cellular telecommunication network in which the present invention is implemented.

FIG. 1 represents a wireless cellular telecommunication network in which the present invention is implemented.

In FIG. 1, two base stations BS1 and BS2 and eleven wireless telecommunication devices HBS1 to HBS11 of a wireless cellular telecommunication network are shown.

Two base stations BS1 and BS2 and eleven wireless telecommunication devices HBS1 to HBS11 are shown but we can understand that the present invention works when a different, e.g. more important, number of base stations and/or wireless telecommunication devices exist in the wireless cellular telecommunication network.

The wireless telecommunication devices HBS are for example located at home.

The wireless telecommunication devices HBS may be for example home base stations or relays or a combination of relays and home base stations. Each home base station HBS may enable mobile terminals associated to the home base station HBS to access the wireless cellular telecommunication network.

Each relay may enable mobile terminals associated to the relay to access the wireless cellular telecommunication network. For example, relays transmit signals through a downlink channel to mobile terminals and receive signals from mobile terminals through an uplink channel as if they were classic base stations or home base stations. However, unlike a base station or a home base station which has a wired connection to a telecommunication network, the relay only has a wireless connection with a base station or a home base station and its connection to the telecommunication network is done via the base station or the home base station.

The wireless telecommunication devices HBSi with i=1 to 11 are able to receive signals transferred by mobile terminals which are located in the cell they respectively manage. The wireless telecommunication devices HBSi transfer signals which can be received and processed by mobile terminals located in the cell they respectively manage.

The wireless telecommunication devices HBS1 to HBS5 are located in the cell managed by the base station BS1.

The wireless telecommunication devices HBS6 to HBS11 are located in the cell managed by the base station BS2.

A coordinator 10 may be included in the wireless cellular telecommunication network. The coordinator 10 may control the ICIC procedure and allocate group identifiers to wireless telecommunication devices HB1 to HB11 according to the present invention.

The coordinator 10 may interface the wireless telecommunication devices HBS with the remaining devices of the wireless cellular telecommunication network.

According to the invention, wireless telecommunication devices HBSi with i=1 to 11 are grouped into plural groups of wireless telecommunication devices. Each wireless telecommunication device of a group of wireless telecommunication devices shares the same common identifier and the same set of parameters for controlling the interferences generated by radio signals transferred to or by the wireless telecommunication devices.

Parameters for controlling the interferences generated by radio signals transferred to or by the wireless telecommunication devices are determined according to an ICIC procedure.

For example, a part of the resource is reserved to cell-edge mobile terminals. To this end, parameters for controlling the transmission power pattern are defined and specify in which frequency band or bands the transmit power should be higher and in which frequency band or bands the transmit power should be lower. Parameters are defined in order to provide a situation in which two neighbouring groups of wireless telecommunication devices or a base station and one group of wireless telecommunication devices comprising at least one wireless telecommunication device which is neighbour of this base station have different power transmission levels in different frequency bands.

The group of wireless telecommunication devices G1DL comprises the wireless telecommunication devices HBS1, HBS2 and HBS3 which share the same physical cell identity and which apply, in case no wireless telecommunication device belongs to plural groups of wireless telecommunication devices for downlink channel, the same parameters for controlling the interferences generated by radio signals for downlink communication.

The group of wireless telecommunication devices G1UL comprises the wireless telecommunication devices HBS1 and HBS2 which share the same physical cell identity and which apply, in case no wireless telecommunication device belongs to plural groups of wireless telecommunication devices for uplink channel, the same parameters for controlling the interferences generated by radio signals for uplink communication.

The group of wireless telecommunication devices G2DL comprises the wireless telecommunication devices HBS4 and HBS5 which share the same physical cell identity and which apply, in case no wireless telecommunication device belongs to plural groups of wireless telecommunication devices for downlink channel, the same parameters for controlling the interferences generated by radio signals for downlink communication.

The group of wireless telecommunication devices G2UL comprises the wireless telecommunication devices HBS3, HBS4 and HBS5 which share the same physical cell identity and which apply, in case no wireless telecommunication device belongs to plural groups of wireless telecommunication devices for uplink channel, the same parameters for controlling the interferences generated by radio signals for uplink communication.

The group of wireless telecommunication devices G3DL comprises the wireless telecommunication devices HBS6, HBS7 and HBS8 which share the same physical cell identity and which apply, in case no wireless telecommunication device belongs to plural groups of wireless telecommunication devices for downlink channel, the same parameters for controlling the interferences generated by radio signals for downlink communication.

The group of wireless telecommunication devices G3UL comprises the wireless telecommunication devices HBS6 and HBS7 which share the same physical cell identity and which apply, in case no wireless telecommunication device belongs to plural groups of wireless telecommunication devices for uplink channel, the same parameters for controlling the interferences generated by radio signals for uplink communication.

The group of wireless telecommunication devices G4DL comprises the wireless telecommunication devices HBS9, HBS10 and HBS11 which share the same physical cell identity and which apply, in case no wireless telecommunication device belongs to plural groups of wireless telecommunication devices for downlink channel, the same parameters for controlling the interferences generated by radio signals for downlink communication.

The group of wireless telecommunication devices G4UL comprises the wireless telecommunication devices HBS8, HBS9, HBS10, HBS11 which share the same physical cell identity and which apply, in case no wireless telecommunication device belongs to plural groups of wireless telecommunication devices for uplink channel, the same parameters for controlling the interferences generated by radio signals for uplink communication.

A group of wireless telecommunication devices may or may not be geographically localized. The groups of wireless telecommunication devices may be distributed in space, paving the space with groups of wireless telecommunication devices and base stations.

For example the groups of wireless telecommunication devices may be at first determined according to location information and may change as it will be disclosed herein after.

According to the example of FIG. 1, each wireless telecommunication device HBS transfers at least two physical cell identities, at least one of the physical cell identities, i.e. a group identifier, is transferred also by other wireless telecommunication devices belonging to the same downlink group or uplink group. At least one physical cell identity is not transferred by each wireless telecommunication device of the group of wireless telecommunication devices, preferably not transferred by any other wireless telecommunication device of the group of wireless telecommunication devices.

The base stations BSj with j=1 to 2 and the coordinator 10 are linked together by a communication network not shown in FIG. 1.

The wireless telecommunication devices HBSi, with i=1 to 11, may be linked by the communication network if the wireless telecommunication devices are home base stations.

The communication network is for example, a PSTN network (Public Switch Telecommunication Network) or a packet switched network like an ISDN (Integrated Services Digital Network) network, etc.

According to the invention, each base station BS or the coordinator 10:
  forms at least one group of wireless telecommunication devices,
  allocates at least one identifier to each wireless telecommunication device of the group of wireless telecommunication devices, the at least one identifier, said as group identifier being allocated to each wireless telecommunication device of the group of wireless telecommunication devices, the group identifier being intended to be transferred by each wireless telecommunication device of the group of wireless telecommunication devices to mobile terminals in parallel with at least another identifier which is not shared with each wireless telecommunication device of the group of wireless telecommunication devices,
  allocates the same parameters for controlling the interferences generated by radio signals transferred to or by each wireless telecommunication device of the group of wireless telecommunication devices.

According to the invention, at least one wireless telecommunication device:
  obtains a couple of information formed by a first identifier of the wireless telecommunication device intended to be transferred by the wireless telecommunication device to mobile terminals and by parameters for controlling the interferences generated by radio signals transferred by or to the wireless telecommunication device,
  obtains a second identifier of the wireless telecommunication device, the second identifier being intended to be transferred by the wireless telecommunication device,
  transfers the first and second identifiers to mobile terminals,
  transfers radio signals according to the parameters for controlling the interferences generated by radio signals or transfers a message to at least one mobile terminal, the message comprising information related to the parameters for controlling the interferences generated by radio signals transferred by the at least one mobile terminal.

Figure 2:
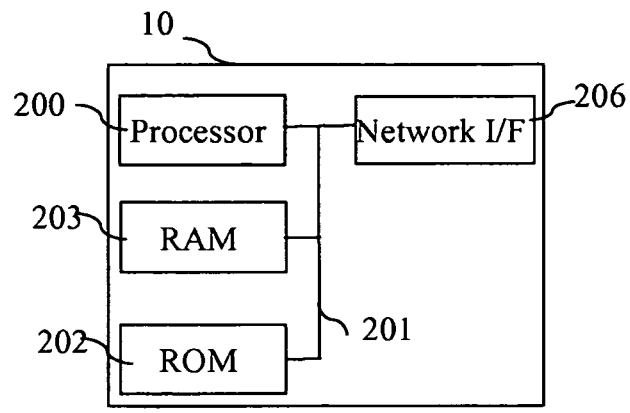
FIG. 2 is a diagram representing the architecture of a coordinator in which the present invention is implemented.

FIG. 2 is a diagram representing the architecture of a coordinator 10 in which the present invention is implemented.

The coordinator 10 has, for example, an architecture based on components connected together by a bus 201 and a processor 200 controlled by the program as disclosed in FIG. 5.

It has to be noted here that, instead of being based on a processor, the architecture of the coordinator may be based on dedicated integrated circuits.

The bus 201 links the processor 200 to a read only memory ROM 202, a random access memory RAM 203 and a network interface 206.

The memory 203 contains registers intended to receive variables and the instructions of the program related to the algorithm as disclosed in FIG. 5.

The processor 200 controls the operation of the network interface 206.

The read only memory 202 contains instructions of the program related to the algorithm as disclosed in FIG. 5, which are transferred, when the coordinator 10 is powered on, to the random access memory 203.

The coordinator 10 is connected to a telecommunication network through the network interface 206. For example, the network interface 206 is a DSL (Digital Subscriber Line) modem, or an ISDN (Integrated Services Digital Network) interface, etc.

Through the network interface 206, the coordinator 10 may transfer messages to wireless telecommunication devices or to base stations BS of the wireless cellular telecommunication network or to core devices of the wireless cellular telecommunication network not shown in FIG. 1.

Figure 3:
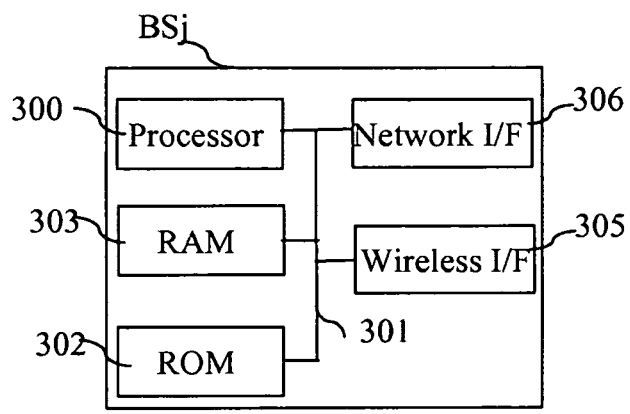
FIG. 3 is a diagram representing the architecture of a base station in which the present invention is implemented.

FIG. 3 is a diagram representing the architecture of a base station in which the present invention is implemented.

The base station BS has, for example, an architecture based on components connected together by a bus 301 and a processor 300 controlled by the program as disclosed in FIG. 5.

It has to be noted here that, instead of being based on a processor, the architecture of the base station BS may be based on dedicated integrated circuits.

The bus 301 links the processor 300 to a read only memory ROM 302, a random access memory RAM 303, a wireless interface 305 and a network interface 306.

The memory 303 contains registers intended to receive variables and the instructions of the program related to the algorithm as disclosed in FIG. 5.

The processor 300 controls the operation of the network interface 306 and of the wireless interface 305.

The read only memory 302 contains instructions of the program related to the algorithms as disclosed in FIG. 5, which are transferred, when the base station BS is powered on, to the random access memory 303.

The base station BS may be connected to a telecommunication network through the network interface 306. For example, the network interface 306 is a DSL (Digital Subscriber Line) modem, or an ISDN (Integrated Services Digital Network) interface, etc.

Through the network interface 306, the base station BS may transfer messages to other base stations BS or to wireless telecommunication devices HBS or to the coordinator 10 or to core devices of the wireless cellular telecommunication network.

The wireless interface 305 and the network interface 306 are the resources of the base station BS that may be used by a mobile terminal in order to access the wireless cellular telecommunication network when the mobile terminal establishes or receives a communication with a remote telecommunication device.

The wireless interface 305 comprises a downlink transmission module and an uplink reception module.

Figure 4:
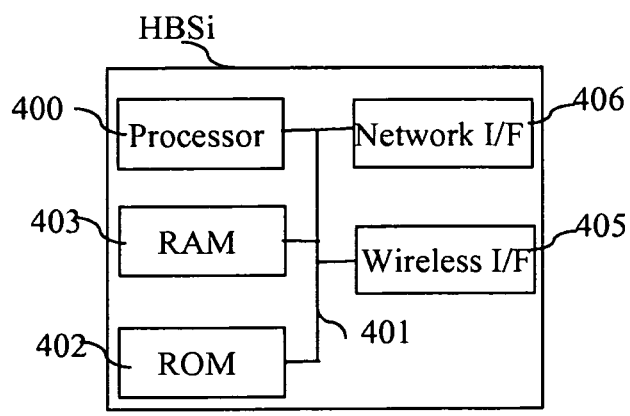
FIG. 4 is a diagram representing the architecture of a wireless telecommunication device in which the present invention is implemented.

FIG. 4 is a diagram representing the architecture of a wireless telecommunication device in which the present invention is implemented.

The wireless telecommunication device HBS has, for example, an architecture based on components connected together by a bus 401 and a processor 400 controlled by the program as disclosed in FIG. 6 or 7 or 8.

It has to be noted here that, instead of being based on a processor, the architecture of the wireless telecommunication device HBS may be based on dedicated integrated circuits.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in FIG. 6 or 7 or 8.

The processor 400 controls the operation of the network interface 406 and of the wireless interface 405.

The read only memory 402 contains instructions of the program related to the algorithm as disclosed in FIG. 6 or 7 or 8, which are transferred, when the wireless telecommunication device HBS is powered on, to the random access memory 403.

If the wireless telecommunication device HBS is a home base station, the wireless telecommunication device HBS may be connected to a telecommunication network through the network interface 406. For example, the network interface 406 is a DSL (Digital Subscriber Line) modem, or an ISDN (Integrated Services Digital Network) interface, etc.

Through the network interface 406, the home base station HBS may transfer messages to other base stations BS or to home base stations HBS or to the coordinator 10.

The wireless interface 405 and the network interface 406 are the resources of the home base station HBS that may be used by a mobile terminal in order to access the wireless cellular telecommunication network when the mobile terminal establishes or receives a communication with a remote telecommunication device.

If the wireless telecommunication device HBS is a home base station, the wireless interface 405 comprises a downlink transmission module and an uplink reception module.

If the wireless telecommunication device HBS is a relay, the wireless interface 405 comprises a downlink reception module and an uplink transmission module for the transfer of signals between the relay and a base station BS. The wireless interface 405 further comprises a downlink transmission module and an uplink reception module for the transfer of signals between the relay and mobile terminals.

FIG. 5 discloses an example of an algorithm executed by the coordinator or the base station according to a first mode of realisation of the present invention.

More precisely, the present algorithm is executed by the processor 200 of the coordinator 10 or by the processor 300 of each base station BS1 or BS2.

The present algorithm will be disclosed when it is executed by the processor 200 of the coordinator 10.

At step S500, the processor 200 forms a group of wireless telecommunication devices HBS. The group of wireless telecommunication devices may be formed using the location information of the wireless telecommunication devices HBS.

At step S501, the processor 200 detects the reception, through the network interface 206, of information related to interferences measured by the mobile terminals and/or by the base station BS1 or BS2 and/or by wireless telecommunication devices.

Information related to interferences are for example the power strength of signals transferred by or to neighbour base stations or by or to at least one group of wireless telecommunication devices, each identified by a physical cell identity, and received by mobile terminals and/or base stations BS and/or wireless telecommunication devices HBS.

Each mobile terminal transfers a message comprising information related to interferences to the base station which is currently serving it.

The message is used as such by the serving base station BS when it executes the present algorithm or is transferred by the serving base station BS to the coordinator 10 or is processed by the serving base station BS and the result of the process is transferred to the coordinator 10.

At next step S502, the processor 200 determines a set of ICIC parameters for the group of wireless telecommunication devices identified at step S500.

For example, ICIC procedure reserves a part of the resource to cell-edge mobile terminals.

To this end, a power pattern is defined for each base station BS or group of wireless telecommunication devices HBS, where the maximum transmit power to be used by each mobile terminal for uplink transmission with the base station BS or with a wireless telecommunication device HBS of group of wireless telecommunication devices HBS and/or by the base station or by the wireless telecommunication devices HBS of the group of wireless telecommunication devices for downlink transmission in a given frequency resource varies.

This pattern changes from one base station BS or one group of wireless telecommunication devices HBS to another. For example, two neighbouring base stations BS and/or groups of wireless telecommunication devices HBS have different patterns.

The ICIC parameters are then optimized depending on the level of interference mobile terminals suffer from or create.

In a variant, the processor 200 determines a set of ICIC parameters for each wireless telecommunication device HBS the processor 200 is aware of the existence or for each wireless telecommunication device HBS comprised in a group of wireless telecommunication devices and may modify the group of wireless telecommunication devices according to the determined sets of ICIC parameters.

At next step S503, the processor 200 determines one common physical cell identity, named group identifier, to be commonly transferred by the wireless telecommunication devices of the group of wireless telecommunication devices.

According to a particular feature of the present invention, a physical cell identity corresponds to one set of ICIC parameters.

Among the five hundred and four physical cell identities, some of them, for example twenty of them are reserved for groups of home base stations and each of them corresponds to a set of ICIC parameters for uplink channel or a set of ICIC parameters for downlink channel.

At next step S504, the processor 200 may determine one other physical cell identity for each wireless telecommunication device HBS of the group of wireless telecommunication devices. In a variant, the other physical cell identity is determined by a core network device of the wireless cellular telecommunication network or by each wireless telecommunication device HBS.

Each other physical cell identity allocated to a wireless cellular telecommunication device is not shared with each wireless telecommunication device of the group of wireless telecommunication devices.

At next step S505, the processor 200 allocates the set of ICIC parameters determined at step S502 and which corresponds to the group identifier determined for the group of wireless telecommunication devices.

At next step S506, the processor 200 checks if the set or sets of ICIC parameters determined at step S502 are different from the previous set of ICIC parameters determined for the group of wireless telecommunication devices.

If the set or sets of ICIC parameters determined at step S502 are different from the previous set of ICIC parameters, the processor 200 moves to step S507. Otherwise, the processor 200 interrupts the present algorithm.

At step S507, the processor 200 informs at least one wireless telecommunication device of the group of wireless telecommunication devices.

The processor 200 may transfer to each wireless telecommunication device the physical cell identity determined at step S504.

The processor 200 may command the transfer of a message comprising the group identifier determined at step S503 to each wireless telecommunication device of the group of wireless telecommunication devices and/or may command the transfer of a message comprising the set of ICIC parameters allocated at step S505 to each wireless telecommunication device of the group of wireless telecommunication devices.

The processor 200 may command the transfer of a message comprising the group identifier determined at step S503 to one or more wireless telecommunication devices HBS of the group of wireless telecommunication devices, the one or more wireless telecommunication devices HBS being then switched to another group of wireless telecommunication devices sharing the same group identifier and/or may command the transfer of a message comprising the set of ICIC parameters allocated at step S504 to one or more wireless telecommunication devices HBS of the group of wireless telecommunication devices, the wireless telecommunication device HBS being then switched to another group of wireless telecommunication devices sharing the same set of ICIC parameters and thus the same group identifier.

The processor 200 may command the transfer of a message comprising the group identifier determined at step S503 to one or more wireless telecommunication devices of the group of wireless telecommunication devices, the message further comprising the set of ICIC parameters allocated at step S504 to one or more wireless telecommunication devices HBS of the group of wireless telecommunication devices.

By doing so, the processor 200 modifies the groups of wireless telecommunication devices in order to improve the interference levels of wireless telecommunication devices HBS among the groups of wireless telecommunication devices.

After that, the processor 200 interrupts the present algorithm.

FIG. 6 discloses an example of an algorithm executed by a wireless telecommunication device when the coordinator executes the algorithm of FIG. 5 according to the first mode of realisation of the present invention.

More precisely, the present algorithm is executed by the processor 400 of each wireless telecommunication device HBS.

According to the invention, each wireless telecommunication device HBS transfers to mobile terminals at least a first and a second identifiers. The first identifier, named group identifier, is transferred by each wireless telecommunication device HBS of a group of wireless telecommunication devices and the second identifier is not transferred by each wireless telecommunication device HBS of the group of wireless telecommunication devices.

At step S600, the processor 200 obtains the second identifier which has been allocated by the coordinator 10 or by a core network device of the wireless cellular telecommunication network.

At step S601, the processor 400 checks if a message comprising a new group identifier is received from the coordinator 10.

If a message comprising a new group identifier is received, the processor 400 moves to step S602. Otherwise, the processor 400 moves to step S603.

At step S602, the processor 400 updates the couple of information to be used by the wireless telecommunication device.

The couple of information comprises the group identifier which is transferred to mobile terminals through the wireless interface 405 and the set of ICIC parameters to be used for transferring signals on the downlink channel.

According to a particular feature, the processor 400 uses the new group identifier as a key in a look-up table stored in memory 403 in order to get the new set of ICIC parameters.

At next step S603, the processor 400 checks if a message comprising a new set of ICIC parameters is received from the coordinator 10 or if the message processed at step S601 further comprises a new set of ICIC parameters.

If a message comprising a new set of ICIC parameters is received from the coordinator 10 or if the message processed at step S601 further comprises a new set of ICIC parameters, the processor 400 moves to step S604. Otherwise, the processor 400 moves to step S605.

At step S604, the processor 400 updates the couple of information to be used by the wireless telecommunication device HBS.

The couple of information comprises the set of ICIC parameters to be used for transferring signals on the downlink channel or on the uplink channel and the group identifier which is transferred to mobile terminals through the wireless interface 405.

According to a particular feature, the processor 400 uses the new set of ICIC parameters as a key in a look-up table stored in memory 403 in order to get the new group identifier or get the group identifier from the received message.

At next step S605, the processor 400 commands the transfer of the group identifier and of the second physical cell identity through the wireless interface 405.

The group identifier and the second physical cell identity are transferred in parallel.

The second physical cell identity is transferred together with associated pilot symbols and data. For example, the structure of pilots and the scrambling of data is linked to the second physical cell identity.

The group identifier may be transferred together with associated pilot symbols. For example, the structure of pilots is linked to the group identifier. The group identifier is not transferred together with associated data, except some system information like a cell global identity if needed. It means that the cell the group identifier represents, is not a true cell, to which a mobile terminal may be handed over and through which a mobile terminal can access to the wireless cellular telecommunication network. However, all or part of the aforementioned identifiers, pilots and data may be transferred in a superimposed way, i.e. at the same time and on the same frequency resources.

It has to be noted here that, the transmission power of the group identifier may be lower than the transmission power of the second physical cell identity.

As plural wireless telecommunication devices transfer the group identifier, the reception power at mobile terminal is increased.

At next step S606, the processor 400 commands the wireless interface 405 in order to apply the set of ICIC parameters for transferring signals on the downlink channel or commands the transfers of information related to the set of ICIC parameters to be used by mobile terminals served by the wireless telecommunication device HBS for transferring signals.

After that, the processor 400 interrupts the present algorithm.

FIG. 7 discloses an example of an algorithm executed by a wireless telecommunication device according to a second mode of realisation of the present invention.

According to the second mode of realisation, the determination of the belonging of a wireless telecommunication device HBS in a group of wireless telecommunication devices is executed in a distributed manner, i.e. by each wireless telecommunication device HBS.

More precisely, the present algorithm is executed by the processor 400 of each wireless telecommunication device HBS.

At step S700, the processor 400 commands the wireless interface 405 in order to scan the signals received from neighbouring wireless telecommunication devices HBS and/or neighbouring base stations BS.

At that step, the wireless interface 405 detects all the physical cell identities transferred by neighbouring wireless telecommunication devices HBS and/or base stations BS.

At next step S701, the processor 400 selects one physical cell identity, named group identifier for the wireless telecommunication device HBS.

According to a particular feature, each possible physical cell identities that may be allocated to a group of wireless telecommunication devices is memorised in the RAM memory 403.

The processor 400 selects a physical cell identity according to the physical cell identities detected by the wireless interface 405. According to a variant, the processor 400 selects the same physical cell identity as neighbours from possible physical cell identities that may be allocated to a group of wireless telecommunication devices.

According to another variant, the processor 400 selects a physical cell identity identities which is or are not detected from possible physical cell identities that may be allocated to a group of wireless telecommunication devices, in order to use different patterns as neighbouring wireless telecommunication devices HBS and then reduce wireless telecommunication device HBS to wireless telecommunication device HBS interferences.

For example, if no physical cell identity is detected from possible physical cell identities that may be allocated to a group of wireless telecommunication devices, the processor 400 selects a physical cell identity randomly among possible physical cell identities that may be allocated to a group of wireless telecommunication devices.

At next step S702, the processor 400 updates if needed the set of ICIC parameters to be used for transferring signals on the downlink channel or on the uplink channel.

The processor 400 uses the physical cell identity as a key in a look-up table stored in memory 403 in order to get the set of ICIC parameters.

At next step S703, the processor 400 obtains a second physical cell identity to be transferred by the wireless cellular telecommunication device HBS to mobile terminals. The second physical cell identity is for example received from the coordinator 10 or from one base station HBS or from a core network device of the wireless cellular telecommunication network or selected by the wireless cellular telecommunication device HBS and memorized in the RAM memory 403.

The second physical cell identity is different from the second physical cell identity allocated to at least one wireless telecommunication sharing the same group identifier.

The second physical cell identity may be different from the second physical cell identity allocated to each other wireless telecommunication sharing the same group identifier.

At next step S704, the processor 400 commands the transfer of the group identifier and of the second physical cell identity through the wireless interface 405.

The group identifier and the second physical cell identity are transferred in parallel.

The second physical cell identity is transferred together with associated pilot symbols and data. For example, the structure of pilots and the scrambling of data is linked to the physical cell identity.

The group identifier may be transferred together with associated pilot symbols. For example, the structure of pilots symbols is linked to the group identifier. The group identifier is not transferred together with associated data, except some system information like a cell global identity if needed. It means that the cell the group identifier represents, is not a true cell, to which a mobile terminal may be handed over and through which a mobile terminal can access to the wireless cellular telecommunication network. However, all or part of the aforementioned identifiers, pilots and data may be transferred in a superimposed way, i.e., at the same time and on the same frequency resources.

At the same step, the processor 400 commands the wireless interface 405 in order to apply the set of ICIC parameters for transferring signals on the downlink channel or commands the transfers of information related to the set of ICIC parameters to be used by mobile terminals HBS for transferring signals.

After that, the processor 400 interrupts the present algorithm.

FIG. 8 discloses an example of an algorithm executed by a wireless telecommunication device when plural base stations and/or coordinators execute the algorithm of FIG. 5 according to the first mode of realisation of the present invention.

When each base station executes the algorithm of FIG. 5 or one coordinator 10 and one base station BS the algorithm of FIG. 5 or when two coordinators 10 execute the algorithm of FIG. 5, sometimes two group identifiers may be allocated to a wireless telecommunication device for the same downlink or uplink channel.

As there is a strong relationship between a group identifier and a set of ICIC parameters, a wireless telecommunication device HBS may be requested to use two different sets of ICIC parameters by two different telecommunication devices like base station BS or coordinator 10.

More precisely, the present algorithm is executed by the processor 400 of each home base station HBS.

According to the invention, each wireless telecommunication device HBS transfers to mobile terminals at least a first and a second identifiers. The first identifier, named group identifier, is transferred by each wireless telecommunication device HBS of a group of wireless telecommunication devices and the second identifier is not transferred by each wireless telecommunication device HBS of the group of wireless telecommunication devices.

At step S800, the processor 200 obtains the second identifier which has been allocated by the coordinator 10 or by a base station BS or by a core network device of the wireless cellular telecommunication network or by the wireless telecommunication device HBS.

At step S801, the processor 400 checks if a message comprising a new group identifier is received from the coordinator 10.

If a message comprising a new group identifier is received, the processor 400 moves to step S802. Otherwise, the processor 400 moves to step S806.

At step S802, the processor 400 updates the couple of information to be used by the wireless telecommunication device.

The couple of information comprises the group identifier which is transferred to mobile terminals through the wireless interface 405 and the set of ICIC parameters to be used for transferring signals on the downlink channel or on the uplink channel.

According to a particular feature, the processor 400 uses the new group identifier as a key in a look-up table stored in memory 403 in order to get the new set of ICIC parameters.

At next step S803, the processor 400 checks if at least two telecommunication devices like a base station BS or a coordinator 10 have transferred a message comprising a group identifier which corresponds to a same downlink or uplink channel.

If at least two telecommunication devices have transferred a message comprising a group identifier which corresponds to a same downlink or uplink channel, the processor 400 moves to step S804. Otherwise, the processor 400 moves to step S806.

At next step S804, the processor 400 obtains the sets of ICIC parameters which correspond to the group identifiers transferred by different telecommunication devices and which correspond to the same downlink or uplink channel.

The processor 400 may use the group identifiers as a key in a look-up table stored in memory 403 in order to get the sets of ICIC parameters.

The processor 400 selects a set of ICIC parameters which guarantees all constraints expected from the at least two sets of ICIC parameters.

For example, the processor 400 selects among the at least two sets of ICIC parameters, the one which corresponds to a minimum transmission power. The processor 400 may select, for each frequency band, the lowest transmission power among the at least two indicated for the frequency band in the sets of ICIC parameters.

After that, the processor 400 moves to step S806.

If there is no look-up table in memory 403, the processor 400 moves from step S803 to step S806.

At next step S806, the processor 400 checks if a message comprising a new set of ICIC parameters is received from the coordinator 10 or if the message processed at step S801 further comprises a new set of ICIC parameters.

If a message comprising a new set of ICIC parameters is received from the coordinator 10 or if the message processed at step S801 further comprises a new set of ICIC parameters, the processor 400 moves to step S807. Otherwise, the processor 400 moves to step S810.

At next step S807, the processor 400 checks if at least two telecommunication devices have transferred a message comprising a set of ICIC parameters or if a telecommunication device has transferred a set of ICIC parameters which does not correspond to a group identifier transferred by another telecommunication device for a same downlink or uplink channel.

If at least two telecommunication devices have transferred a message comprising a set of ICIC parameters or if a telecommunication device has transferred a set of ICIC parameters which does not correspond to a group identifier transferred by another telecommunication device for a same downlink or uplink channel, the processor 400 moves to step S808. Otherwise, the processor 400 moves to step S809.

At next step S808, the processor 400 obtains the at least two sets of ICIC parameters which correspond to the same downlink or uplink channel.

The processor 400 selects a set of ICIC parameters which guarantees all constraints expected from the at least two sets of ICIC parameters. For example, the processor 400 selects among the at least two sets of ICIC parameters, the one which corresponds to a minimum transmission power. The processor 400 may select, for each frequency band, the lowest transmission power among the at least two indicated for the frequency band in the sets of ICIC parameters.

After that, the processor 400 moves to step S810.

At step S809, the processor 400 updates each couple of information to be used by the wireless telecommunication device.

If two telecommunication devices like a base station BS or a coordinator 10 have transferred a message comprising a group identifier which corresponds to a same downlink or uplink channel, the processor 400 memorises a first couple of information comprising one received group identifier and the set of ICIC parameters determined at step S804 or S808 and memorises a second couple of information comprising another received group identifier and the set of ICIC parameters determined at step S804 or S808.

At next step S810, the processor 400 commands the transfer of at least one group identifier and of the second physical cell identity through the wireless interface 405.

The or each group identifier may be transferred together with associated pilot symbols. The or each group identifier is not transferred together with associated data. It means that the cell that the group identifier represents, is not a true cell, to which a mobile terminal may be handed over and through which a mobile terminal can access to the wireless cellular telecommunication network. However, all or part of the aforementioned identifiers, pilots and data may be transferred in a superimposed way, i.e. at the same time and on the same frequency resources.

It has to be noted here that the transmission power of the group identifier or identifiers may be lower than the transmission power of the second physical cell identity.

As plural wireless telecommunication devices transfer the same group identifier, the reception power at mobile terminal is increased.

At next step S811, the processor 400 commands the wireless interface 405 in order to apply the set of ICIC parameters for transferring signals on the downlink channel or commands the transfers of information related to the set of ICIC parameters to be used by mobile terminals HBS for transferring signals.

After that, the processor 400 interrupts the present algorithm.

Naturally, many modifications can be made to the embodiments of the invention described above without departing from the scope of the present invention.

The invention claimed is:

1. A method for controlling interferences generated by radio signals transferred by or to wireless telecommunication devices of a wireless cellular telecommunication network, the method comprising:
   forming at least one group of wireless telecommunication devices;
   allocating at least one identifier to each wireless telecommunication device of the group of wireless telecommunication devices, the at least one identifier being a group identifier and being allocated to each wireless communication device of the group of wireless telecommunication devices, the group identifier is to be transferred by each wireless telecommunication device of the group of wireless telecommunication devices to mobile terminals in parallel with another identifier which is not shared with each wireless telecommunication device of the group of wireless telecommunication devices; and
   allocating same parameters for controlling the interferences generated by radio signals transferred to or by each wireless telecommunication device of the group of wireless telecommunication devices.

2. The method according to claim 1, wherein the group identifier and the parameters for controlling the interferences generated by radio signals form a couple of information, the couple of information being for an uplink channel or for a downlink channel of the wireless telecommunication device.

3. The method according to claim 1 or 2, further comprising:
   receiving information representative of interferences received by at least one mobile terminal and/or at least one wireless telecommunication device and/or at least one base station;
   determining, from the information representative of interferences, other parameters for controlling the interferences generated by radio signals;
   determining, from the other parameters for controlling the interferences generated by radio signals, another group identifier to be allocated to each wireless telecommunication device of at least a part of the group of wireless telecommunication devices; and
   transferring to the at least part of the group of wireless telecommunication devices the other group identifier and/or the other parameters for controlling the interferences generated by radio signals.

4. The method according to claim 1, wherein the method is executed by a base station or a coordinator of the wireless cellular telecommunication network.

5. A non-transitory computer-readable medium encoded with computer-readable instructions that, when executed by a processor, cause the processor to perform a method according to claim 1.

6. A device for controlling interferences generated by radio signals transferred by or to wireless telecommunication devices of a wireless cellular telecommunication network, the device comprising:
   circuitry that
   forms at least one group of wireless telecommunication devices,
   allocates at least one identifier to each wireless telecommunication device of the group of wireless telecommunication devices, the at least one identifier being a group identifier and being allocated to each wireless telecommunication device of the group of wireless telecommunication devices, the group identifier is to be transferred by each wireless telecommunication device of the group of wireless telecommunication devices to mobile terminals in parallel with another identifier which is not shared with each wireless telecommunication device of the group of wireless telecommunication devices, and
   allocates same parameters for controlling the interferences generated by radio signals transferred to or by each wireless telecommunication device of the group of wireless telecommunication devices.

* * * * *